United States Patent [19]

Yanagisawa

[11] Patent Number: 5,159,484
[45] Date of Patent: Oct. 27, 1992

[54] REFLECTION MIRROR SUPPORT STRUCTURE OF RASTER SCANNER

[75] Inventor: Katsuyuki Yanagisawa, Saitama, Japan

[73] Assignee: Fuji Xerox Co., Ltd., Tokyo, Japan

[21] Appl. No.: 831,062

[22] Filed: Feb. 4, 1992

[30] Foreign Application Priority Data

Feb. 12, 1991 [JP] Japan .................. 3-60768

[51] Int. Cl.⁵ .............................. G02B 26/08
[52] U.S. Cl. ......................... 359/224; 359/198; 346/108; 346/160
[58] Field of Search ............... 359/196, 223, 224, 871, 359/872, 198, 225–226, 838; 346/108, 160

[56] References Cited

U.S. PATENT DOCUMENTS 4,707,715 11/1987 Miura ...................... 346/160

FOREIGN PATENT DOCUMENTS 61-46561 3/1986 Japan .
61-278810 12/1986 Japan ........................ 359/871

Primary Examiner—Bruce Y. Arnold
Assistant Examiner—James Phan
Attorney, Agent, or Firm—Finnegan, Henderson, Farabow, Garrett & Dunner

[57] ABSTRACT

Disclosed is a reflection-mirror support structure in a raster scanner having at least one reflection mirror on a light path between a light source and a photosensitive body so that in repsonse to an image signal a beam is moved to perform scanning for every scanning line through a beam deflection means to thereby write a latent image corresponding to the image signal on the photosensitive body. The reflection-mirror support structure comprises a stopper member for restricting a lower end edge position of the reflection mirror, a support member for supporting the reflection mirror slantingly at a predetermined angle, a holder member for positioning the reflection mirror relative to the stopper and the supports and for holding the reflection mirror, and a vibration suppressing member for urging a substantially-central portion of an upper end edge of the reflection mirror against the stopper, whereby the vibration of the reflection mirror is surely suppressed while keeping the surface flatness of the reflection mirror well so that the beam scanning position on the photosensitive body is made so as not to be displaced to thereby maintain the good printing quality.

6 Claims, 4 Drawing Sheets

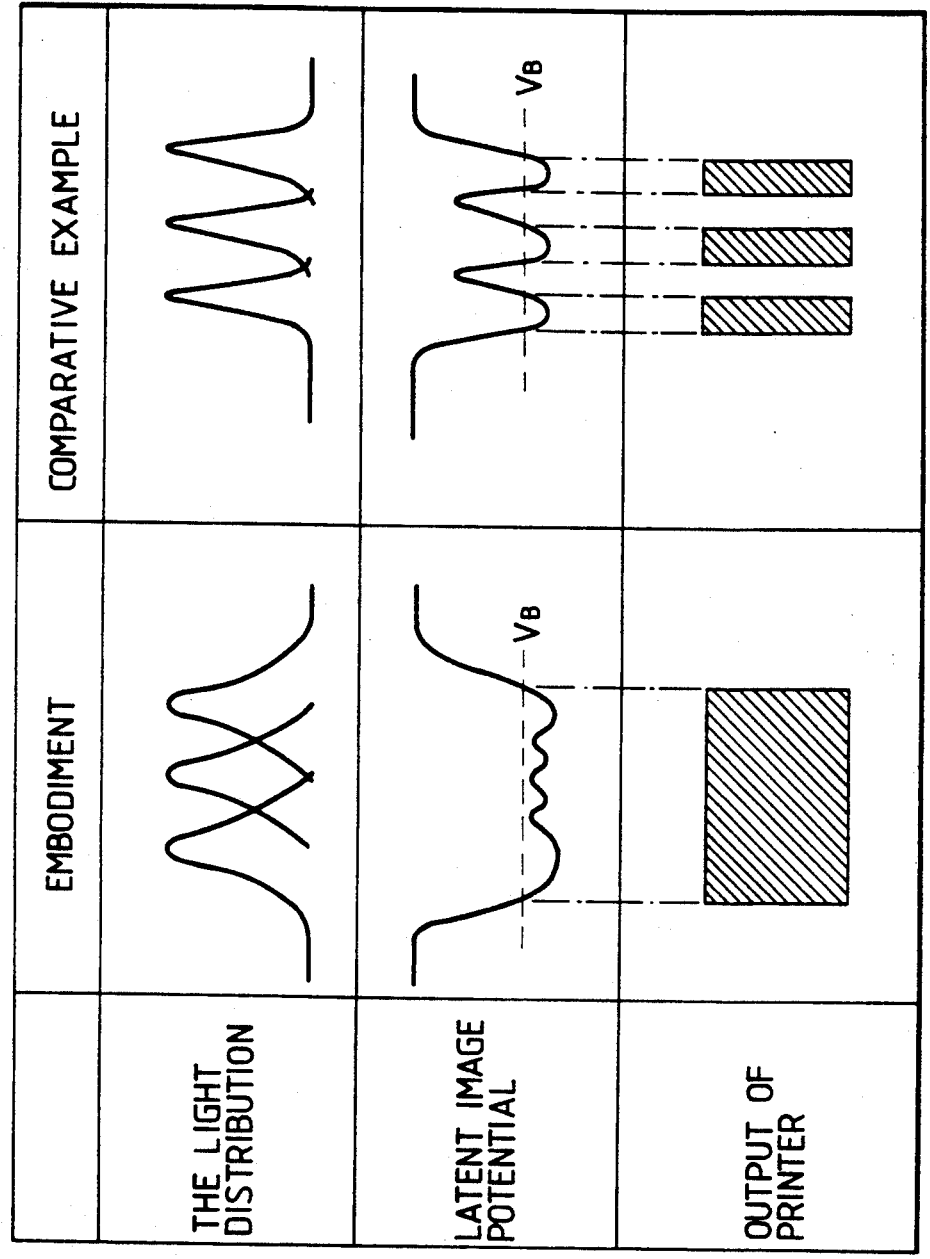

REFLECTION MIRROR SUPPORT STRUCTURE OF RASTER SCANNER

BACKGROUND OF THE INVENTION

The present invention relates to a raster scanner, and particularly relates to an improvement of a raster scanner having at least one or more reflection mirrors on a light path between a light source and a photosensitive body.

As a raster scanner, generally, a laser scanning system may be given.

Such a laser scanning system is constituted by various kinds of parts such as a laser oscillator, a polygon mirror for distributing a beam emitted from the laser oscillator in a predetermined scanning range, a reflection mirror for leading the beam distributed by the polygon mirror toward a photosensitive drum, etc. In view of keeping the accuracy of the scanned position on the photosensitive drum preferable, it is necessary to perform accurate positioning of the variety of parts of the laser scanning system. To this end, generally, employed is a system in which a laser scanning system is integrally formed into one unit and the laser scanner unit is mounted on a rigid frame of a printer body.

In such a laser printer, however, as a result of detailed inspection of the quality of output printing matters, there was seen a phenomenon of occurrence of deterioration in printing quality, for example, such as density irregularity in the case of obtaining a solid image.

It is considered that such a phenomenon is caused by the fact that vibration from a vibration source such as a driving motor for the polygon mirror, a driving motor for the photosensitive drum, etc. in the laser scanner unit is transmitted to the reflection mirror, so that the reflection mirror 24 is made resonant to thereby displace a beam Bm reflected on the reflection mirror 24 from a predetermined position on the surface of the photosensitive drum 10 as shown in (a) and (b) of FIG. 9. In fact, as an example of density irregularity when a solid image is to be obtained, there occurs density irregularity of a pitch of v/f mm, in which where v represents a subsidiary scanning rate [mm/sec.] of the photosensitive drum 10, and f represents a primary resonant frequency of the reflection mirror, as shown in FIG. 10.

In order to solve such a problem, there has been a proposal in which a laser scanner unit and a photosensitive drum are integrally mounted on a rigid frame, and the rigid frame is supported by a basic frame through an elastic member so that the vibration generated by a vibration source can be absorbed by the elastic member (Japanese Utility Model Application (OPI) No. Sho-61-46561, the term "OPI" as used herein means an "unexamined published application"). This proposal, however, is not sufficient as means for solving the problem described above because not only it is difficult to surely absorb the vibration of the polygon mirror which is rotating at a high speed, but the vibration generated from the basic frame can not be cut off absolutely.

SUMMARY OF THE INVENTION

It is therefore an object of the present invention to solve the above problem in the prior art. It is another object of the present invention to provide a raster scanner in which the vibration of the reflection mirror is surely suppressed while keeping the surface flatness of the reflection mirror well, so that the beam scanning position on the photosensitive body is made so as not to be displaced to thereby maintain the printing quality good.

To attain the above objects, according to an aspect of the present invention, in a raster scanner having at least one reflection mirror on a light path between a light source and a photosensitive body so that in response to an image signal a beam is moved to perform scanning for every scanning line through a beam deflection means to thereby write a latent image corresponding to the image signal on the photosensitive body, the reflection-mirror support structure comprises a stopper means for restricting a lower end edge position of the reflection mirror, a support means for supporting the reflection mirror slantingly at a predetermined angle, a holder means for positioning the reflection mirror relative to the stopper and the supports and for holding the reflection mirror, and a vibration suppressing means for urging a substantially-central portion of an upper end edge of the reflection mirror against the stopper.

BRIEF DESCRIPTION OF THE DRAWINGS

FIG. 8 is an explanatory view showing an example of the image forming process according to the embodiment;

DETAILED DESCRIPTION OF THE PREFERRED EMBODIMENTS

Figure 1:
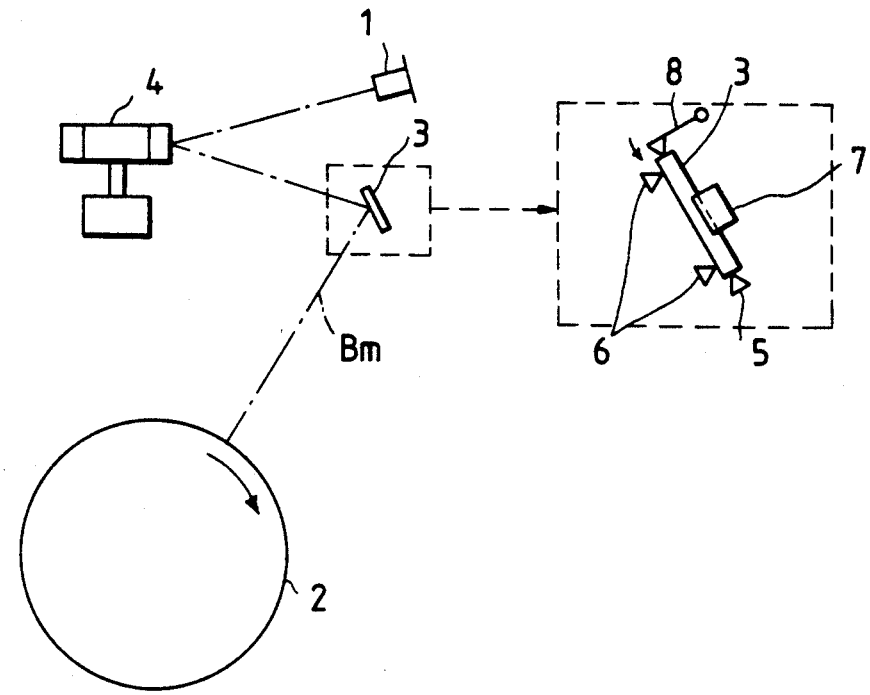
FIG. 1 is a diagram for explaining the configuration of a reflection mirror support structure of the raster scanner according to the present invention.

Now, referring to the drawings, the invention will be described hereunder in detail.

In FIG. 1, in a raster scanner having at least one reflection mirror 3 on a light path between a light source 1 and a photosensitive body 2 so that in response to an image signal a beam Bm is moved to perform scanning for every scanning line through a beam deflection means 4 to thereby write a latent image corresponding to the image signal on the photosensitive body 2, the reflection-mirror support structure comprises a stopper 5 for restricting the lower end edge position of the reflection mirror 3, a support 6 for supporting the reflection mirror 3 slantingly at a predetermined angle, a holder 7 for positioning the reflection mirror 3 relative to the stopper 5 and the support 6 and for holding the reflection mirror 3, and a vibration suppressing member 8 for urging the reflection mirror at a substantially-central portion of an upper end edge thereof against the stopper 5.

In such a structure, as the stopper 5, any member may be employed as long as it can support the lower end edge of the reflection mirror 3. It is however preferable that the stopper 5 is a member which can support the lower end edge of the reflection mirror 3 at two points in view of accurately restricting the lower end edge position of the reflection mirror 3.

Further, as the support 6, any member may be employed as long as it can support the reflection mirror 3 so as to restrict the slanting angle of the reflection mirror 3. It is however preferable that the support 6 is a member which can support the reflection mirror at three points in view of providing an accurate plane.

Further, as the holder 7, any member may be employed as long as it can press the reflection mirror 3 into a predetermined position so as to prevent the reflection mirror 3 from being rickety.

Further, the position at which the vibration suppressing member 8 is provided is not limited to only one position, but a plurality of vibration suppressing members may be provided if necessary. Specifically, for example, the vibration suppressing member 8 may be an elastic body such as a spring member, a rubber member, or the like, which can elastically press the reflection mirror 3, or a screw member which can press the reflection mirror with a plate and a screw. As to the pressing force of the vibration suppressing member 8, it is necessary to select the member so as to generate friction force at an extent that the vibration of the reflection mirror 3 can be limited.

In such a structure as described above, the lower end position of the reflection mirror 3 is restricted by the stopper 5, the slanting posture of the reflection mirror 3 is restricted by the support 6, and the thus restricted reflection mirror 3 is positioned and held by the holder 7.

The vibration suppressing member 8 presses the reflection mirror 3 at the substantially central portion of the upper end edge of the reflection mirror 3, so that even if the vibration generated from the vibration source such as the deflection means 4 or the like is transmitted to the reflection mirror 3 to thereby vibrate the reflection mirror 3, the friction force is generated between the vibration suppressing member 8 and the upper end edge portion of the reflection mirror 3 so that the reflection mirror 3 is prevented from vibrating.

Further, the pressing force of the vibration suppressing member 8 does not act in the direction of the thickness of the reflection mirror 3, so that the reflection mirror 3 is not curved unnecessarily.

Figure 2:
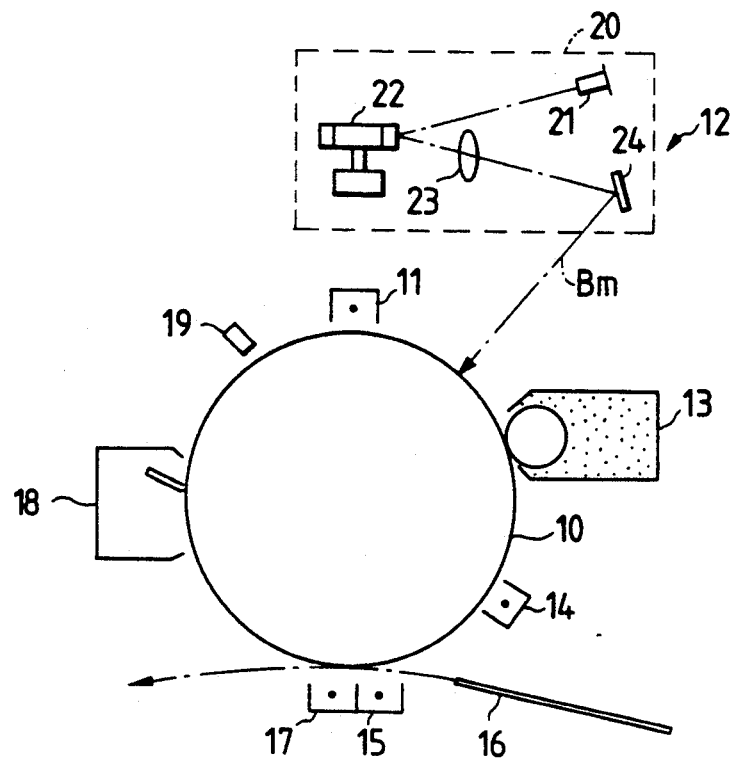
FIG. 2 is a diagram for explaining an embodiment of a laser printer to which the present invention is applied.
Figure 3:
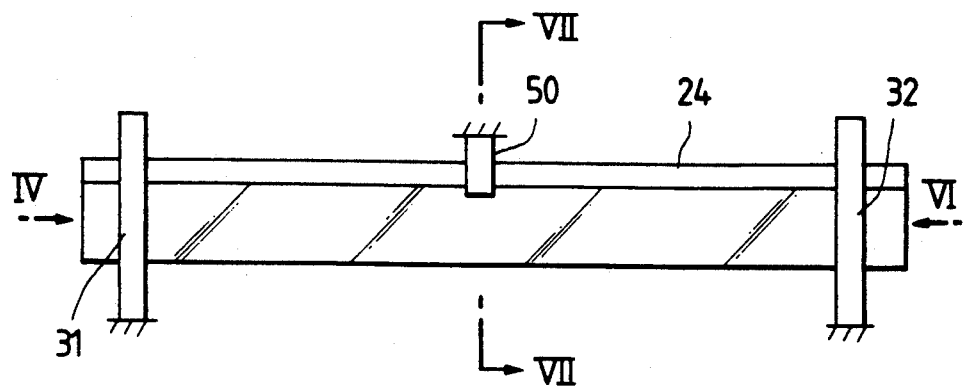
FIG. 3 is an explanatory front view showing the reflection mirror support structure according to the present invention.

FIG. 2 shows an embodiment of the laser printer to which the reflection-mirror support structure according to the present invention is applied.

In the drawing, the laser printer includes a photosensitive drum 10, a charging corotron 11 for charging the photosensitive drum 10 in advance, a laser scanner unit (hereinafter referred to as an ROS [Raster Output Scanner]) 12 for writing, for example, a negative latent image (a latent image in which the potential at an image portion is lower) on the charged photosensitive drum 10, a developer 13 for visually developing with toner the latent image written on the photosensitive drum 10, pre-transfer processing corotron 14 for removing charges of a toner image on the photosensitive drum 10, a transfer corotron for transferring the toner image on the photosensitive drum 10 onto recording paper 16, a discharge corotron 17 for removing charges on the recording paper 16 after a transfer step and for peeling the recording paper 16 which has been electrostatically attracted onto the photosensitive drum 10, a cleaner 18 for removing the residual toner on the photosensitive drum 10, and a discharge lamp 19 for removing the residual charges on the photosensitive drum 10.

In this embodiment, the ROS 12 is constituted by a semiconductor laser 21, a polygon mirror 22 for distributing a beam Bm emitted from the semiconductor laser 21 over a scanning range on the photosensitive drum 10, an f-$\theta$ lens 23 for correcting the beam Bm distributed by the polygon mirror 22 so that the beam Bm draws a straight locus corresponding to a scanning line on the photosensitive drum 10, and for example, one reflection mirror 24 for reflecting the beam Bm transmitted through the f-$\theta$ lens 23 toward the photosensitive drum 10, those constituent parts being housed in a unit casing 20 with a predetermined positional relation. Further, the support structure for the reflection mirror 24 in this embodiment is such that, for example, as shown in FIGS. 3 through 7, the opposite ends of the reflection mirror 24 are supported by a pair of support frames 31 and 32, and the reflection mirror 24 is pressed downward at the substantially central portion of the upper end edge thereof by a pressing spring 50.

Figure 4:
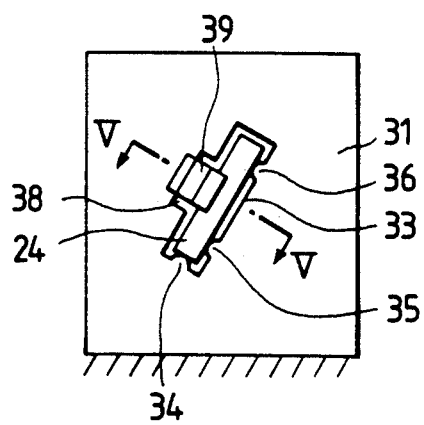
FIG. 4 is a diagram when the structure of FIG. 3 is viewed from the direction of an arrow IV.
Figure 5:
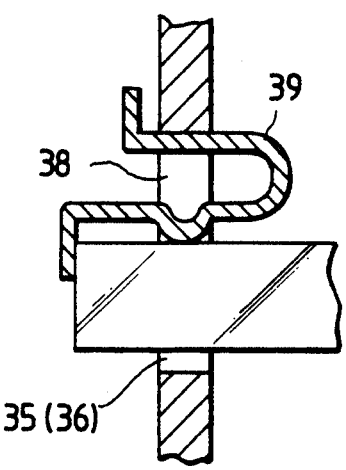
FIG. 5 is a section taken on a line V—V in FIG. 4.
Figure 6:
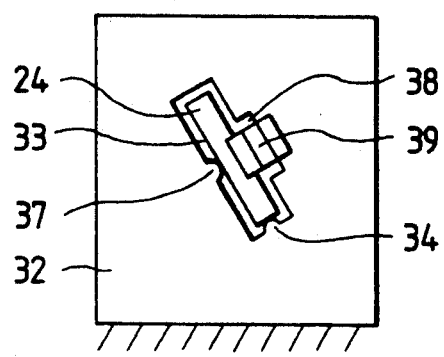
FIG. 6 is a diagram when the structure of FIG. 3 is viewed from the direction of an arrow VI.
Figure 7:
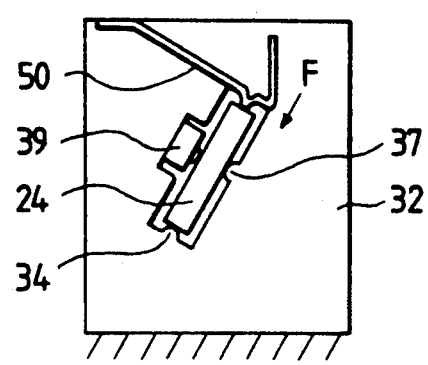
FIG. 7 is a section taken on a line VII—VII in FIG. 3.
Figure 9A:
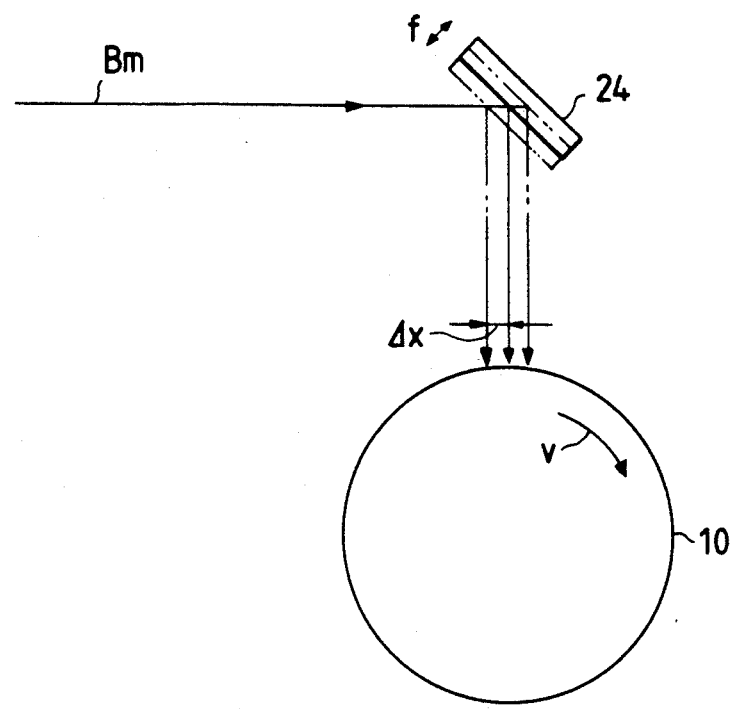
FIG. 9($a$) is an explanatory view showing the phenomenon of displacement of a beam scanning position due to resonance of the reflection mirror, and FIG. 9($b$) is an explanatory view showing the resonance state of the reflection mirror.
Figure 9B:
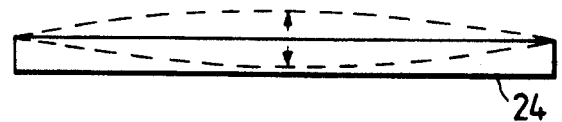
Figure 10:
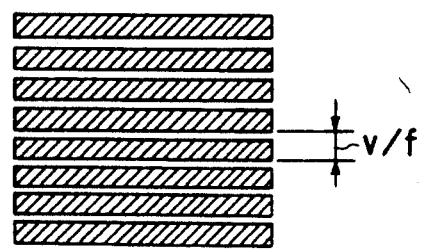
FIG. 10 is an explanatory view showing the state of the deteriorated image quality caused by the resonance of the reflection mirror.

More specifically, as shown particularly in FIGS. 4 and 5, the support frame 31 has a rectangular mirror insertion opening 33 into which the reflection mirror 24 is to be inserted, a protrusion-like stopper 34 integrally formed on the frame 31 at the lower end edge of the opening 33 so that the lower end of reflection mirror 24 abuts on the stopper 34, two support protrusions 35 and 36 integrally formed on the frame 31 at one side edge of the opening 33 adjacent to the lower end edge of the opening 33 so that the reflection mirror 24 is mounted at its one side surface on the two support protrusions 35 and 36, and a rocking slit 38 for mounting a clip 39 and provided in the frame 31 at the other side edge of the opening 33 adjacent to the lower end edge of the opening 33 so that the reflection mirror 24 is positioned and held on the stopper 34 and the support protrusions 35 and 36, by means of the clip 39 mounted on the clip mounting slit 38. As shown in FIG. 6, the support frame 32 has the basic configuration which is substantially similar to that of the support frame 31 except that it is different from the latter in that one support protrusion 37 is integrally formed on the support frame 32 at one side edge of the mirror insertion opening 33 adjacent to the lower end edge of the opening 33 so that one side surface of the reflection mirror 24 is mounted on the support protrusion 37. Further, in this embodiment, the reflection mirror 24 has a primary resonance frequency of about 150 Hz, and the pressing spring 50 is made to press the reflection mirror 24 substantially at the central portion of the upper end edge of the reflection mirror 24 with a surface pressure F of about 1,500–2,000 g/cm$^2$.

The performance of the laser scanner unit according to the embodiment will be estimated hereunder.

As a process of estimation, the image quality of, for example, a solid image was estimated. As a result, obtained was a preferable solid image having no density irregularity with about 1 mm pitch which was considered to be most conspicuous visually.

Further, in the solid image, no distortion due to distortion of flatness of the reflection mirror 24 was found at all.

Further, in this embodiment, parameters in the image forming process are adjusted so that the width of a line of a toner image becomes thick. Accordingly, in the solid image, the density irregularity of a pitch not larger than 0.5 mm is prevented from occurring.

That is, in this embodiment, as shown in FIG. 8, when a negative latent image is formed, the light distribution eats into an adjacent pixel range in comparison with a comparative example. Accordingly, for example, the potential distribution of the negative latent image corresponding to a solid image is maintained so as to have an image portion potential lower than a developing bias VB correspondingly to the solid-image range (the comparative example has a possibility that a non-image-portion potential is formed at a portion of the solid-image range), so that it is possible to obtain a good solid image having no density irregularity unlike the comparative example.

As described above, in the reflection-mirror support structure of the raster scanner according to the present invention, the reflection mirror is prevented from vibrating by means of the vibration suppressing member, so that even if vibration is transmitted from a vibration source such as a deflection means or the like to the reflection mirror, the reflection mirror can be prevented from displacing from it proper position. Accordingly, the beam scanning position on a photosensitive body can be prevented from displacing, so that the quality of printing can be kept good.

Further, according to the present invention, the pressing force by means of the vibration suppressing member does not act in the direction of the thickness of the reflection mirror, so that the state in which the reflection mirror is unnecessarily curved can be prevented from occurring, and image distortion due to distortion of the flatness of the reflection mirror, specifically, the linear property in the scanning direction, abnormality in scale factor, etc., can be surely prevented from occurring.

What is claimed is:

1. A reflection-mirror support structure in a raster scanner having at least one reflection mirror on a light path between a light source and a photosensitive body so that in response to an image signal a beam is moved to perform scanning for every scanning line through a beam deflection means to thereby write a latent image corresponding to said image signal on said photosensitive body, the reflection-mirror support structure comprising:

stopper means for restricting a lower end edge position of said reflection mirror;
   support means for supporting said reflection mirror slantingly at a predetermined angle;
   holder means for positioning said reflection mirror relative to said stopper means and said support means and for holding said reflection mirror; and
   vibration suppressing means for urging a substantially-central portion of an upper end edge of said reflection mirror against said stopper means.

2. The reflection-mirror support structure according to claim 1, wherein said stopper means is arranged to support the lower end edge position of said reflection mirror at two points.

3. The reflection-mirror support structure according to claim 1, wherein said support means is arranged to support said reflection mirror at three points.

4. The reflection-mirror support structure according to claim 1, wherein said vibration suppressing means includes a spring member for elastically pressing said reflection mirror.

5. The reflection-mirror support structure according to claim 1, wherein said vibration suppressing means includes a rubber member for elastically pressing said reflection mirror.

6. The reflection-mirror support structure according to claim 1, wherein said vibration suppressing means includes a screw member and a plate for pressing said reflection mirror with said screw member.

* * * * *